United States Patent
Kim

(10) Patent No.: US 8,378,637 B2
(45) Date of Patent: Feb. 19, 2013

(54) SELF-DISCHARGE CIRCUIT FOR SECONDARY BATTERY, AND SECONDARY BATTERY INCLUDING THE SAME

(75) Inventor: Woochoul Kim, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 371 days.

(21) Appl. No.: 12/707,020

(22) Filed: Feb. 17, 2010

(65) Prior Publication Data

US 2010/0207586 A1  Aug. 19, 2010

(30) Foreign Application Priority Data

Feb. 18, 2009  (KR) ........................ 10-2009-0013487

(51) Int. Cl.
*H02J 7/00* (2006.01)
*H02H 3/20* (2006.01)
*H02H 3/00* (2006.01)

(52) U.S. Cl. ............. 320/134; 320/136; 361/90; 361/88

(58) Field of Classification Search .................. 320/134, 320/136; 361/90, 88
See application file for complete search history.

(56) References Cited

U.S. PATENT DOCUMENTS

| | | | |
|---|---|---|---|
| 5,252,411 A | | 10/1993 | Yokokawa et al. |
| 5,945,809 A | * | 8/1999 | Inaba et al. .................. 320/134 |
| 5,959,436 A | * | 9/1999 | Takashina et al. ............ 320/134 |
| 5,982,148 A | * | 11/1999 | Mercer ......................... 320/134 |
| 6,608,470 B1 | | 8/2003 | Oglesbee et al. |
| 2003/0076642 A1 | | 4/2003 | Shiner et al. |
| 2007/0182545 A1 | * | 8/2007 | Baum et al. ............... 340/539.11 |

FOREIGN PATENT DOCUMENTS

| | | |
|---|---|---|
| EP | 0 854 556 A2 | 7/1998 |
| JP | 01-152930 | 6/1989 |
| JP | 02-159933 | 6/1990 |
| JP | 07-212983 | 8/1995 |
| KR | 1998-064037 A | 10/1998 |
| KR | 10-2006-0106336 | 10/2006 |
| KR | 10-2006-0120830 | 11/2006 |
| KR | 10-2008-0045324 | 5/2008 |
| WO | WO 2006/115342 | 11/2006 |
| WO | WO 2007/011175 | 1/2007 |

OTHER PUBLICATIONS

Korean Notice of Allowance dated Apr. 18, 2011 for application KR 10-2009-0013487 (5 pages).
Machine English Translation of JP 07-212983.

* cited by examiner

*Primary Examiner* — M'Baye Diao
(74) *Attorney, Agent, or Firm* — Christie, Parker & Hale, LLP

(57) ABSTRACT

A self-discharge circuit for a secondary battery having a bare cell includes a self-discharge unit, both ends of which are connected to a positive electrode and a negative electrode of the bare cell. The self-discharge unit includes a switching device and a zener diode that are connected serially with respect to each other, and the zener diode is in an opposite direction to a discharge direction of the bare cell. A secondary battery including the self-discharge circuit is also provided.

10 Claims, 1 Drawing Sheet

SELF-DISCHARGE CIRCUIT FOR SECONDARY BATTERY, AND SECONDARY BATTERY INCLUDING THE SAME

CROSS-REFERENCE TO RELATED APPLICATION

This application claims the benefit of Korean Patent Application No. 10-2009-0013487, filed on Feb. 18, 2009, in the Korean Intellectual Property Office, the disclosure of which is incorporated herein by reference.

BACKGROUND OF THE INVENTION

1. Field of the Invention

An aspect of the present invention relates to a self-discharge circuit for a secondary battery, and a secondary battery including the same.

2. Description of the Related Art

With rapid development of the electronic, communication and computer industries, there is an increase in the use of portable electronic apparatuses. Most of such portable electronic apparatuses employ secondary (rechargeable) batteries as power sources.

Technologies for preventing the charging of secondary batteries at a high temperature are currently available to ensure the safety and reliability of the secondary batteries. However, it is impossible to completely prevent a swelling phenomenon of secondary batteries using such currently available technologies. That is, when secondary batteries are charged and exposed to a high temperature environment, the swelling of the secondary batteries still occurs. In particular, an electronic apparatus built in a vehicle, e.g., a navigation system is generally left in the vehicle connected to a cigar jack, and the temperature of a dashboard of a vehicle can easily reach 80° C. in the summer. In this case, even when the charging of secondary batteries in the navigation system is prevented, there is a high chance of swelling of the secondary batteries since the secondary batteries are in an almost fully charged state.

SUMMARY OF THE INVENTION

An aspect of the present invention provides a self-discharge circuit capable of preventing a swelling phenomenon of a secondary battery in a high temperature environment and maintaining a voltage level of the secondary battery at a reference voltage or greater.

An aspect of the present invention also provides a secondary battery including the self-discharge circuit.

According to an aspect of the present invention, there is provided a self-discharge circuit for a secondary battery including a bare cell, the self-discharge circuit including a self-discharge unit, both ends of which are connected to a positive electrode and a negative electrode of the bare cell, wherein the self-discharge unit includes a switching device and a zener diode that are connected serially with respect to each other, and the zener diode is in an opposite direction to a discharge direction of the bare cell.

According to another aspect of the present invention, the self-discharge unit may further include a current controller controlling the amount of current flowing in the self-discharge unit. Here, the current controller may be a resistor.

According to another aspect of the present invention, the self-discharge circuit may further include a temperature sensor detecting the temperature of the secondary battery and converting the detected temperature to an electrical signal. Here, the temperature sensor may be a thermistor.

According to another aspect of the present invention, the self-discharge circuit may further include a control unit outputting a control signal to the switching device of the self-discharge unit.

According to another aspect of the present invention, the control unit may be connected in parallel to the self-discharge unit, the control unit may include a temperature resistance device and a voltage distribution device that are connected serially with respect to each other, and a voltage applied to the voltage distribution device may be a control signal of the switching device of the self-discharge unit.

According to another aspect of the present invention, the temperature resistance device may be a negative temperature coefficient (NTC) device, and the switching device of the self-discharge unit may be an N-channel field-effect transistor (FET).

According to another aspect of the present invention, the temperature resistance device may be a positive temperature coefficient (PTC) device, and the switching device of the self-discharge unit may be a P-channel FET.

According to another aspect of the present invention, the voltage distribution device may be a resistor.

According to another aspect of the present invention, the breakdown voltage of the zener diode may be a voltage of the bare cell when the charge rate of the bare cell is 50%.

According to another aspect of the present invention, there is provided a secondary battery including the above-described self-discharge circuit.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
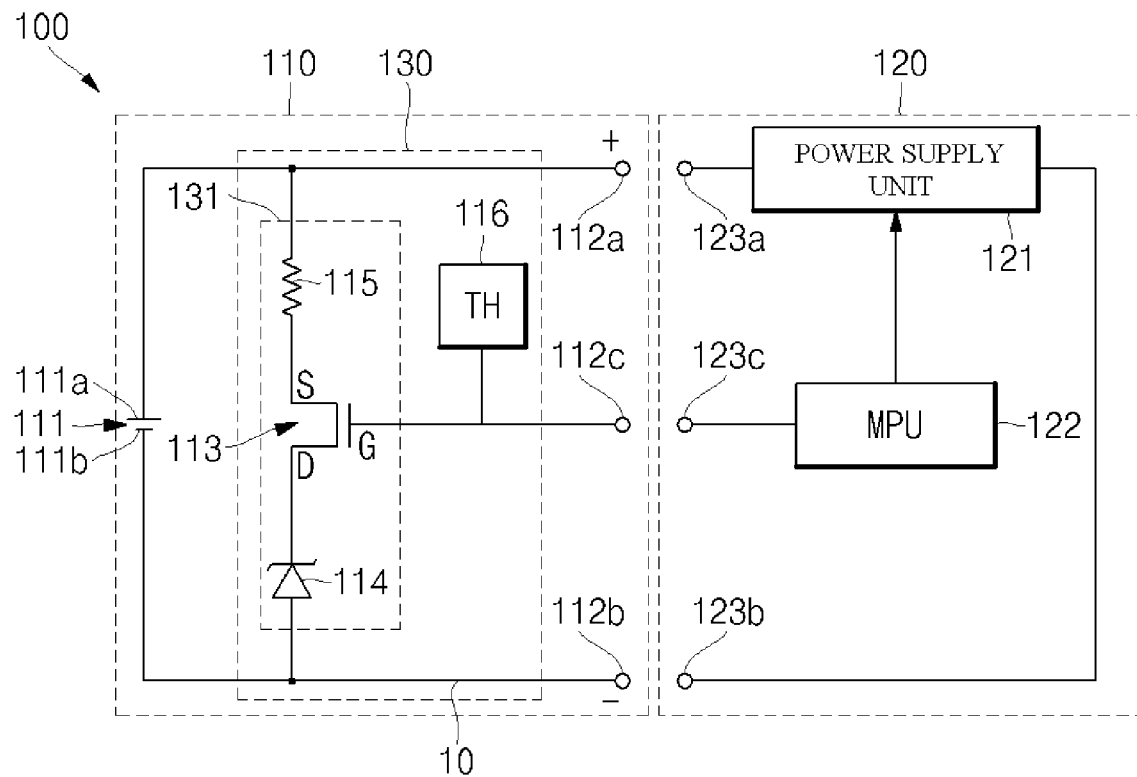
FIG. 1 is a circuit view of a charge-discharge system for a secondary battery including a self-discharge circuit according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is a circuit view of a charge-discharge system for a secondary battery including a self-discharge circuit according to an embodiment of the present invention.

Referring to FIG. 1, a charge-discharge system 100 includes a secondary battery 110 and a portable electronic apparatus 120 in which the secondary battery 110 is installed.

The secondary battery 110 includes a bare cell 111; a plurality of external terminals; and a self-discharge circuit 130.

The bare cell 111, which is structured to store and supply an electrical energy to an external device (not shown), includes a positive electrode 111a and a negative electrode 111b. The bare cell 110 may be a lithium ion battery or a lithium polymer battery. FIG. 1 illustrates a single bare cell, but the present invention is not limited thereto. A plurality of bare cells may be connected serially, in parallel, or in a combination of serial and parallel connection.

The external terminals may include a first positive terminal 112a; a first negative terminal 112b; and a first data terminal 112c. The first positive terminal 112a and the first negative terminal 112b are respectively electrically connected to the positive electrode 111a and the negative electrode 111b of the bare cell 111 on a high-current path 10 through which charge/discharge current flows. The first positive terminal 112a and the first negative terminal 112b are electrically connected to the portable electronic apparatus 120 so that charge/discharge current flows to the portable electronic apparatus 120. The first data terminal 112c is electrically connected to the self-discharge circuit 130. A temperature signal of the secondary battery 110 is transmitted to the portable electronic apparatus 120 via the first data terminal 112c. A control signal generated from the portable electronic apparatus 120 is transmitted to the self-discharge circuit 130 via the first data terminal 112c. A data transfer path through the first data terminal 112c may be established by the SMbus protocols commonly known in the art.

The self-discharge circuit 130 includes a self-discharge unit 131 and a temperature sensor 116. The self-discharge circuit 130 is responsible for allowing or preventing the self-discharge of the bare cell 111.

The self-discharge unit 131 includes a switching device 113, a zener diode 114, and a current controller 115 that are connected serially with respect to each other. Both ends of the self-discharge unit 131 are connected in parallel to the first positive terminal 112a and the first negative terminal 112b. Both ends of the self-discharge unit 131 are electrically connected to the positive electrode 111a and the negative electrode 111b of the bare cell 111 to thereby create a self-discharge path for the bare cell 111.

The switching device 113 may be a field-effect transistor (FET), and a source S and a drain D of the switching device 113 are respectively electrically connected to the positive electrode 111a and the negative electrode 111b of the bare cell 111. A gate G of the switching device 113 is electrically connected to the first data terminal 112c. The switching device 113 is turned on/off in response to the control signal transmitted through the first data terminal 112c from the portable electronic apparatus 120. Although this aspect of the invention has been described in connection with the embodiment where the switching device 113 is a FET, this aspect of the present invention is not limited thereto. The switching device 113 may also be a bipolar junction transistor (BJT) or the like.

The zener diode 114 is connected between the switching device 113 and the negative electrode 111b of the bare cell 111 in an opposite direction to the discharge direction of the bare cell 111. In a case where the switching device 113 is in an "ON" state, the zener diode 114 allows the self-discharge of the bare cell 11 only when the voltage of the bare cell 111 is equal to or greater than a breakdown voltage (hereinafter, also referred to as a "reference voltage") of the zener diode 114. Here, the breakdown voltage of the zener diode 114 may be defined as a voltage of the bare cell 111 when the bare cell 111 is charged 50%. That is, in a case where the switching device 113 is turned-on, only when the charge rate of the bare cell 111 is 50% or greater, the bare cell 111 is self-discharged.

Thus, even when the switching device 113 keeps an "ON" state, the bare cell 111 can retain a charge rate of 50%, thereby effectively preventing the overdischarge of the bare cell 111 during the self-discharge. Although this aspect of the invention has been described in connection with the embodiment where the breakdown voltage of the zener diode 114 is a voltage of the bare cell 111 when the charge rate of the bare cell 111 is 50%, this aspect of the present invention is not limited thereto. The breakdown voltage of the zener diode 114 may be optionally selected from voltages of the bare cell 111 between a fully-charged state and a fully-discharged state of the bare cell 111.

The current controller 115 may be a resistor and is disposed between the switching device 113 and the positive electrode 111a of the bare cell 111. The current controller 115 is responsible for appropriately controlling a self-discharge current.

The temperature sensor 116 measures the ambient temperature of the secondary battery 110 and converts the measured temperature to an electrical signal. The temperature sensor 116 is electrically connected to the first data terminal 112c. An electrical signal generated from the temperature sensor 116 is transmitted to the portable electronic apparatus 120 via the first data terminal 112c. The temperature sensor 116 may be a thermistor, but this aspect of the present invention is not limited thereto.

The portable electronic apparatus 120 includes a power supply unit 121; a microprocessor unit (MPU) 122; and a plurality of external terminals. The portable electronic apparatus 120 may be a navigation system that is built in a vehicle and is easily exposed to a high temperature environment, but this aspect of the present invention is not limited thereto.

The power supply unit 121 may include a switching device (not shown) controlled by the MPU 122 and an adaptor (not shown) responsible for power conversion and supply. The power supply unit 121 is responsible for supplying a charge current to the secondary battery 110 or the discharge current of the secondary battery 110 to a power source of the portable electronic apparatus 120. The power supply unit 121 may also supply an external power directly to the power source of the portable electronic apparatus 120.

The MPU 122 may include a microprocessor (not shown); and a passive element (not shown), an active element (not shown), and a memory (not shown) that are electrically connected to the microprocessor. The MPU 122 receives a temperature signal from the temperature sensor 116 of the secondary battery 110, and outputs a signal controlling the on/off state of the switching device 113 of the secondary battery 110 in response to the temperature signal. Only when the temperature of the secondary battery 110 is a predetermined temperature or greater that is generally considered as a high temperature, the MPU 122 outputs a control signal allowing the switching device 113 of the secondary battery 110 to be in an "ON" state.

The external terminals may include a second positive terminal 123a; a second negative terminal 123b; and a second data terminal 123c. The second positive terminal 123a and the second negative terminal 123b are electrically connected to the power supply unit 121. When the secondary battery 110 is installed in the portable electronic apparatus 120, the second positive terminal 123a and the second negative terminal 123b are respectively connected to the first positive terminal 112a and the first negative terminal 112b of the secondary battery 110 to create a charge/discharge current path. The second data terminal 123c is electrically connected to the MPU 122. When the secondary battery 110 is installed in the portable electronic apparatus 120, the second data terminal 123c is electrically connected to the first data terminal 112c of the secondary battery 110.

Hereinafter, the principle of the self-discharge operation of the secondary battery 110 will be described in detail with reference to FIG. 1.

This aspect of the invention will be described hereinafter, for example, assuming that the high temperature condition of the secondary battery 110 is 60° C. and the breakdown voltage of the zener diode 114 is a voltage of the bare cell 111 when the charge rate of the bare cell 111 is 50%. However, it should be understood that the high temperature condition of the secondary battery 110 and the breakdown voltage of the zener diode 114 may be optionally changed.

If the secondary battery 110 is exposed to an environment of less than 60° C., the temperature of the secondary battery 110 is converted to an electrical signal by the temperature sensor 116, and the electrical signal is transmitted to the MPU 122 of the portable electronic apparatus 120 via the first data terminal 112c of the secondary battery 110. The MPU 122 of the portable electronic apparatus 120 outputs a control signal for allowing the switching device 113 to be turned-off in response to the electrical signal, and the switching device 113 is turned-off in response to the control signal transmitted through the first data terminal 112c from the MPU 122. Therefore, the self-discharge unit 131 prevents the self-discharge of the bare cell 111, and thus, the secondary battery 110 is normally charged or discharged.

On the other hand, if the secondary battery 110 is exposed to an environment of 60° C. or greater, the temperature of the secondary battery 110 is converted to an electrical signal by the temperature sensor 116, and the electrical signal is transmitted to the MPU 122 of the portable electronic apparatus 120 via the first data terminal 112c of the secondary battery 110. The MPU 122 of the portable electronic apparatus 120 outputs a control signal for allowing the switching device 113 to be turned-on in response to the electrical signal, and the switching device 113 is turned-on in response to the control signal transmitted through the first data terminal 112c from the MPU 122. At this time, when the charge rate of the bare cell 111 is less than 50%, the zener diode 114 prevents the self-discharge of the bare cell 111 and the bare cell 111 retains a charge rate of less than 50%. If the charge rate of the bare cell 111 is 50% or greater, the voltage of the bare cell 111 is equal to or greater than the breakdown voltage of the zener diode 114, and thus, the self-discharge path is formed to initiate the self-discharge of the bare cell 111. When the charge rate of the bare cell 111 is reduced to less than 50% during the self-discharge, the zener diode 114 prevents the self-discharge of the bare cell 111. Therefore, the bare cell 111 can retain a charge rate of less than 50% in a high temperature condition. The charge rate of less than 50% is an optimal condition for preventing the swelling of the bare cell 111 in a high temperature environment.

Figure 2:
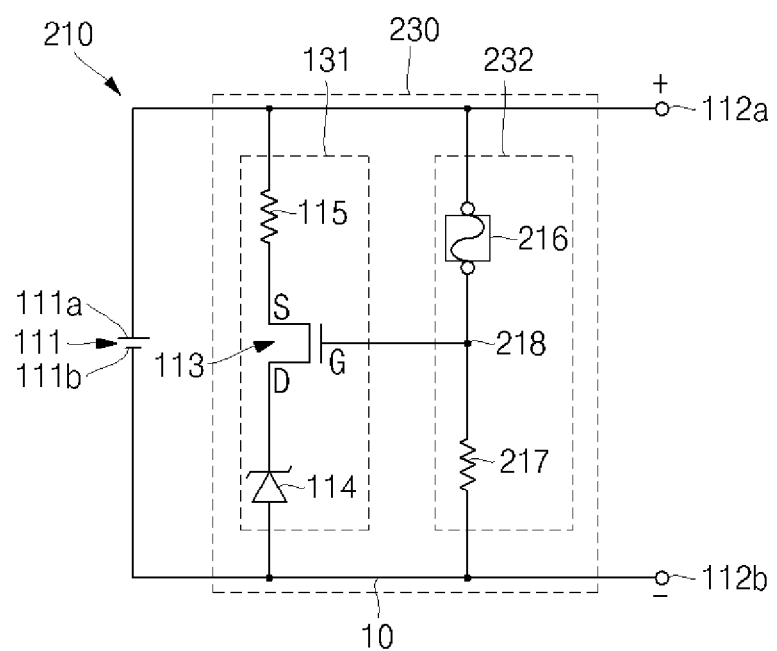
FIG. 2 is a circuit view of a secondary battery including a self-discharge circuit according to another embodiment of the present invention.

FIG. 2 is a circuit view illustrating a secondary battery including a self-discharge circuit according to another embodiment of the present invention. Referring to FIG. 2, a secondary battery 210 includes a bare cell 111; a plurality of external terminals 112a and 112b; and a self-discharge circuit 230. The bare cell 111 and the external terminals 112a and 112b are substantially the same as illustrated in FIG. 1, and thus, a detailed description thereof will be omitted.

The self-discharge circuit 230 includes a self-discharge unit 131 and a control unit 232 that are connected in parallel to each other. The self-discharge circuit 230 is responsible for allowing or preventing the self-discharge of the bare cell 111. The self-discharge unit 131 is substantially the same as illustrated in FIG. 1, and thus, a detailed description thereof will be omitted.

The control unit 232 includes a temperature resistance device 216 and a voltage distribution device 217 that are connected serially with respect to each other. The control unit 232 outputs a control signal to a switching device 113 of the self-discharge unit 131. A node 218, which is disposed between the temperature resistance device 216 and the voltage distribution device 217, is electrically connected to a gate G of the switching device 113 of the self-discharge unit 131, and a voltage applied to the voltage distribution device 217 serves as an operation signal of the switching device 113 of the self-discharge unit 131.

The temperature resistance device 216 may be a negative temperature coefficient (NTC) device. The temperature resistance device 216, relative to the voltage distribution device 217, is electrically connected to a positive electrode 111a of the bare cell 111. As the temperature of the secondary battery 210 increases, the resistance of the temperature resistance device 216 decreases, thereby increasing a voltage applied to the voltage distribution device 217. The temperature resistance device 216 adjusts the voltage applied to the voltage distribution device 217 to an appropriate level. When the voltage applied to the voltage distribution device 217 is a predetermined level or greater, the switching device 113 of the self-discharge unit 131 is turned-on. For this, the switching device 113 may be an N-channel FET.

The temperature resistance device 216 may be a positive temperature coefficient (PTC) device. In this case, when the voltage applied to the voltage distribution device 217 is a predetermined level or less, the switching device 113 of the self-discharge unit 131 is turned-on. For this, the switching device 113 may be a P-channel FET.

The voltage distribution device 217 may be a resistor and is responsible for distributing a voltage of the bare cell 110, together with the temperature resistance device 216. The voltage distribution device 217, relative to the temperature resistance device 216, is electrically connected to a negative electrode 111b of the bare cell 111.

Hereinafter, the principle of the self-discharge operation of the secondary battery 210 will be described in detail with reference to FIG. 2.

The invention will be described hereinafter, for example, assuming that the high temperature condition of the secondary battery 210 is 60° C., the breakdown voltage of a zener diode 114 is a voltage of the bare cell 111 when the charge rate of the bare cell 111 is 50%, the temperature resistance device 216 is an NTC, and the switching device 113 is an N-channel FET.

If the secondary battery 210 is exposed to an environment of less than 60° C., based on that a voltage applied to the voltage distribution device 217 of the secondary battery 210 is used as an operation voltage of the switching device 113, a lower voltage than a voltage for turning on the switching device 113 is applied to the gate G of the switching device 113, and thus, the switching device 113 is turned-off. Therefore, the self-discharge unit 131 prevents the self-discharge of the bare cell 111, and thus, the bare cell 110 is normally charged or discharged.

On the other hand, if the secondary battery 110 is exposed to an environment of 60° C. or greater, based on that a voltage applied to the voltage distribution device 217 of the secondary battery 210 is used as an operation voltage of the switching device 113, a higher voltage than a voltage for turning on the switching device 113 is applied to the gate G of the switching device 113, and thus, the switching device 113 is turned-on.

At this time, when the charge rate of the bare cell 111 is less than 50%, the zener diode 114 prevents the self-discharge of the bare cell 111, and thus, the bare cell 111 still retains a charge rate of less than 50%. When the charge rate of the bare cell 111 is 50% or greater, the voltage of the bare cell 111 is equal to or greater than the breakdown voltage of the zener diode 114, and thus, the self-discharge path is formed to initiate the self-discharge of the bare cell 111. When the charge rate of the bare cell 111 is reduced to less than 50% during the self-discharge, the zener diode 114 prevents the self-discharge of the bare cell 111.

As is apparent from the above description, the above objects and other objects of the present invention can be easily achieved by the above-described embodiments. In detail, according to the present invention, a switching device forms the discharge path of a bare cell in a high temperature condition, thereby preventing the swelling of a secondary battery in a high temperature condition.

Furthermore, when the voltage of a bare cell is less than a reference voltage, a zener diode prevents the self-discharge of the bare cell. Therefore, a secondary battery can maintain a voltage level of a reference voltage or greater even in a high temperature condition.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A self-discharge circuit for a secondary battery comprising a bare cell having a positive electrode and a negative electrode, the self-discharge circuit comprising:
    a self-discharge unit comprising:
        first and second ends respectively electrically connected to the positive electrode and the negative electrode of the bare cell; and
        a switching device and a zener diode electrically connected in series with each other; and
    a control unit for outputting a control signal to the switching device of the self-discharge unit,
    wherein the zener diode is electrically connected between the switching device and the negative electrode of the bare cell in a direction opposite to a discharge direction of the bare cell.

2. The self-discharge circuit of claim 1, wherein the control unit is connected in parallel to the self-discharge unit, the control unit comprises a temperature resistance device and a voltage distribution device that are connected serially with respect to each other, and a voltage applied to the voltage distribution device is a control signal of the switching device of the self-discharge unit.

3. The self-discharge circuit of claim 2, wherein the temperature resistance device comprises a negative temperature coefficient (NTC) device, and the switching device of the self-discharge unit comprises an N-channel field-effect transistor (FET).

4. The self-discharge circuit of claim 2, wherein the temperature resistance device comprises a positive temperature coefficient (PTC) device, and the switching device of the self-discharge unit comprises a P-channel FET.

5. The self-discharge circuit of claim 2, wherein the voltage distribution device comprises a resistor.

6. A secondary battery comprising:
    a bare cell comprising a positive electrode and a negative electrode;
    a positive terminal and a negative terminal respectively electrically connected to the positive electrode and the negative electrode of the bare cell; and
    a self-discharge circuit comprising a self-discharge unit comprising:
        first and second ends respectively electrically connected in parallel to the positive terminal and the negative terminal;
        a switching device and a zener diode electrically connected in series with each other; and
        a control unit for outputting a control signal to the switching device of the self-discharge unit,
    wherein the zener diode is electrically connected between the switching device and the negative electrode in a direction opposite to a discharge direction of the bare cell.

7. The secondary battery of claim 6, wherein the control unit is connected in parallel to the self-discharge unit, the control unit comprises a temperature resistance device and a voltage distribution device that are connected serially with respect to each other, and a voltage applied to the voltage distribution device is a control signal of the switching device of the self-discharge unit.

8. The secondary battery of claim 7, wherein the temperature resistance device of the control unit comprises a negative temperature coefficient (NTC) device, and the switching device of the self-discharge unit comprises an N-channel field effect transistor (FET).

9. The secondary battery of claim 7, wherein the temperature resistance device of the control unit comprises a positive temperature coefficient (PTC) device, and the switching device of the self-discharge unit comprises a P-channel field effect transistor (FET).

10. The secondary battery of claim 7, wherein the voltage distribution device of the control unit comprises a resistor.

* * * * *